US012639703B2

(12) United States Patent   (10) Patent No.:  US 12,639,703 B2

Davis   (45) Date of Patent:  May 26, 2026

(54) METHOD AND SYSTEM FOR VALIDATION OF HASHED DATA VIA ACCEPTANCE FRAMES

(71) Applicant: MasterCard International Incorporated, Purchase, NY (US)

(72) Inventor: Steven Charles Davis, Saint Peters, MO (US)

(73) Assignee: Mastercard International Incorporated, Purchase, NY (US)

( * ) Notice: Subject to any disclaimer, the term of this patent is extended or adjusted under 35 U.S.C. 154(b) by 999 days.

(21) Appl. No.: 14/938,213

(22) Filed: Nov. 11, 2015

(65) Prior Publication Data

US 2017/0134280 A1    May 11, 2017

(51) Int. Cl.
*H04L 45/7453* (2022.01)
*G06Q 20/10* (2012.01)
(Continued)

(52) U.S. Cl.
CPC ......... *G06Q 20/3827* (2013.01); *G06Q 20/10* (2013.01); *H04L 9/3236* (2013.01);
(Continued)

(58) Field of Classification Search
CPC ................ G06Q 20/3827; G06Q 20/10; H04L 9/3236; H04L 9/3271; H04L 9/50; H04L 63/123
See application file for complete search history.

(56) References Cited

U.S. PATENT DOCUMENTS 5,530,939 A * 6/1996 Mansfield, Jr. ......... G06F 16/28
6,023,509 A * 2/2000 Herbert .................. G06Q 20/04
380/29

(Continued)

FOREIGN PATENT DOCUMENTS

CN          1653458 A     8/2005
CN        101808097 A     8/2010
(Continued)

OTHER PUBLICATIONS

"IEEE Standard for Local and Metropolitan Area Networks: Media Access Control (MAC) Security," in IEEE Std 802.1AE-2006 , vol., No., pp. 1-150, Aug. 18, 2006, doi: 10.1109/IEEESTD.2006. 245590. (Year: 2006).*

(Continued)

*Primary Examiner* — John W Hayes
*Assistant Examiner* — Taylor S Rak
(74) *Attorney, Agent, or Firm* — Panitch Schwarze Belisario & Nadel LLP

(57) ABSTRACT

A method for validating receipt of hashed data includes: storing an acceptance frame and at least one hashing algorithm; receiving a data value; hashing the received data value using the at least one hashing algorithm to obtain a first hashed package; hashing the received data value and the acceptance frame using the at least one hashing algorithm to obtain a second hashed package; electronically transmitting the first hashed package to a computing device; receiving a received hashed package from the computing device; and validating the received hashed package as being created using the received data value and acceptance frame via comparison of the received hashed package to the second hashed package.

18 Claims, 8 Drawing Sheets

(51) Int. Cl.
| | |
|---|---|
| *G06Q 20/38* | (2012.01) |
| *H04L 9/00* | (2022.01) |
| *H04L 9/32* | (2006.01) |
| *H04L 9/40* | (2022.01) |
| *H04L 67/10* | (2022.01) |

(52) U.S. Cl.
CPC .............. *H04L 9/3271* (2013.01); *H04L 9/50* (2022.05); *H04L 63/123* (2013.01); *H04L 67/10* (2013.01); *G06Q 20/389* (2013.01)

(56) References Cited

U.S. PATENT DOCUMENTS

| | | | | |
|---|---|---|---|---|
| 6,324,637 | B1 | 11/2001 | Hamilton | |
| 7,966,492 | B1* | 6/2011 | Gasparini | ............. H04L 63/083 713/168 |
| 8,862,886 | B2 | 10/2014 | Owlett et al. | |
| 2002/0144154 | A1 | 10/2002 | Tomkow | |
| 2003/0177361 | A1* | 9/2003 | Wheeler | ................ G06Q 20/00 713/176 |
| 2005/0114670 | A1* | 5/2005 | Bowe | .................... H04L 9/3247 713/180 |
| 2007/0174402 | A1* | 7/2007 | Tomkow | .............. G06Q 10/107 709/206 |
| 2007/0192245 | A1 | 8/2007 | Fisher et al. | |
| 2008/0017703 | A1* | 1/2008 | Lu | ......................... G07F 7/1008 235/379 |
| 2012/0151206 | A1 | 6/2012 | Paris et al. | |
| 2015/0206106 | A1* | 7/2015 | Yago | .................. G06Q 20/0655 705/68 |
| 2015/0254459 | A1 | 9/2015 | Wilson | |
| 2015/0288704 | A1* | 10/2015 | Huang | .................. H04L 9/3236 726/4 |
| 2015/0356523 | A1* | 12/2015 | Madden | ............... G06Q 20/383 705/76 |
| 2016/0315963 | A1* | 10/2016 | Fiaschi | ................. H04L 63/123 |
| 2018/0322497 | A1* | 11/2018 | Lewis | ................ G06Q 20/4014 |

FOREIGN PATENT DOCUMENTS

| | | | |
|---|---|---|---|
| CN | 102082664 | A | 6/2011 |
| EP | 2 919 177 | A1 | 9/2015 |
| JP | 2001-084224 | A | 3/2001 |
| JP | 2006-511996 | A | 4/2006 |
| WO | 03/001734 | A1 | 1/2003 |

OTHER PUBLICATIONS

Krawczyk, H., Bellare, M., and R. Canetti, "HMAC: Keyed-Hashing for Message Authentication", RFC 2104, DOI 10.17487/RFC2104, Feb. 1997, <https://www.rfc-editor.org/info/rfc2104>. (Year: 1997).*

Kent, S. and K. Seo, "Security Architecture for the Internet Protocol", RFC 4301, DOI 10.17487/RFC4301, Dec. 2005, <https://www.rfc-editor.org/info/rfc4301>. (Year: 2005).*

CardContact, "Terminal Action Analysis," 2015, openscdp.org, p. 3-4 (Year: 2015).*

Bitcoin Developer Guides "Transactions", 2021, bitcoindeveloper, https://developer.bitcoin.org/devguide/transactions.html (Year: 2021).*

Office Action issued on Mar. 14, 2019, by the Canadian Intellectual Property Office in corresponding Canadian Patent Application No. 3,004,520. (5 pages).

Tak et al., "A Software Framework for Non-repudiation Service in Electronic Commerce based on the Internet," Computer Communications and Networks, 2002, Proceedings, Eleventh International Conference on Oct. 14-16, 2002, Piscataway, NJ, USA, pp. 182-189, IEEE.

Notification of Transmittal of the International Search Report and the Written Opinion of the International Searching Authority (Forms PCT/ISA/220, PCT/ISA/210, and PCT/ISA/237) issued on Feb. 1, 2017, by the European Patent Office in corresponding International Application No. PCT/US2016/060005. (13 pages).

Office Action (Notification of Reasons for Refusal) issued on Jul. 2, 2019, by the Japanese Patent Office in corresponding Japanese Patent Application No. 2018-524200, and an English translation of the Office Action. (10 pages).

Juels et al., "PORs: Proofs of Retrievability for Large Files," Proceedings of the 14th ACM Conference on Computer and Communications Security, CCS'07, ACM, New York, NY, USA, (Oct. 28, 2007), pp. 584-597, XP058192897.

Office Action (Communication pursuant to Article 94(3) EPC) issued on Oct. 7, 2019, by the European Patent Office in corresponding European Patent Application No. 16 805 560.6-1218. (7 pages).

Office Action (First Examination Report) issued on Feb. 28, 2020, by the Intellectual Property India in corresponding India Patent Application No. 201817003696 and an English Translation of the Office Action. (6 pages).

Office Action (First Office Action issued on May 8, 2020, by the China National Intellectual Property Administration in corresponding Chinese Patent Application No. 201680064766.3 and an English Translation of the Office Action. (23 pages).

Office Action issued on Jan. 6, 2021, by the Canadian Intellectual Property Office in corresponding Canadian Patent Application No. 3,004,520. (4 pages).

Office Action (Examination report No. 2 for standard patent application) issued May 10, 2021, by the Australian Patent Office in corresponding Australian Patent Application No. 2019222821. (3 pages).

Office Action issued Jun. 24, 2021, by the Mexican Patent Office in corresponding Mexican Patent Application No. MX/a/2018/005735 and an English Translation of the Office Action. (8 pages).

Office Action issued Oct. 4, 2021, by the Canadian Intellectual Property Office in corresponding Canadian Patent Application No. 3,004,520. (4 pages).

Office Action (Communication pursuant to Article 94(3) EPC) issued on Nov. 3, 2020, by the European Patent Office in corresponding European Patent Application No. 16 805 560.6-1218. (5 pages).

Office Action (The Second Office Action) issued on Nov. 11, 2020, by the State Intellectual Property Office of People's Republic of China in corresponding Chinese Patent Application No. 201680064766.3 and an English Translation of the Office Action. (21 pages).

Office Action issued Nov. 3, 2021, by the Mexican Patent Office in corresponding Mexican Patent Application No. MX/a/2018/005735 and an English Translation of the Office Action. (9 pages).

Office Action issued Jun. 27, 2022 in Australian Application No. 2021204210.

Examination Report No. 2, dated Jan. 3, 2023, issued in corresponding AU Application No. 2021204210, 3 pps.

First Office Action dated Oct. 27, 2022 issued by the China National Intellectual Property Administration in corresponding Application No. 2021104835518 with English translation, 29 pps.

* cited by examiner

100

104

Computing
Device

110

Third Party

108

Payment
Network

Blockchain
Network

106

102

Processing
Server

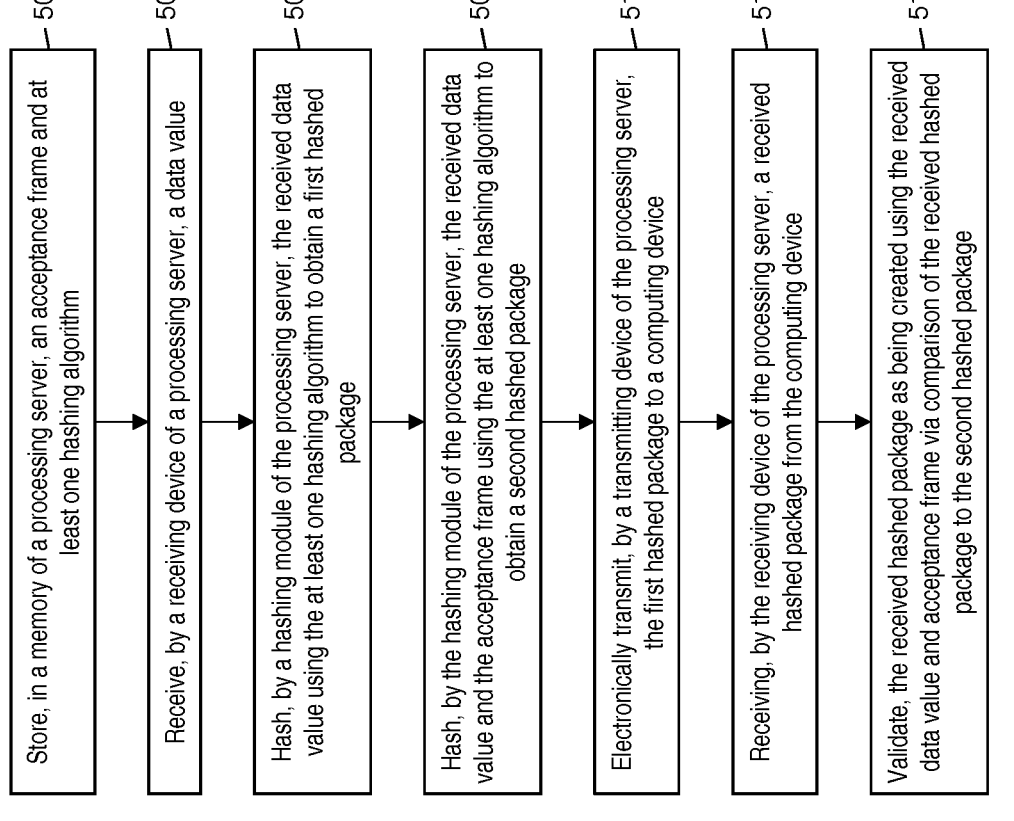

Store, in a memory of a processing server, an acceptance frame and at least one hashing algorithm — 502

Receive, by a receiving device of a processing server, a data value — 504

Hash, by a hashing module of the processing server, the received data value using the at least one hashing algorithm to obtain a first hashed package — 506

Hash, by the hashing module of the processing server, the received data value and the acceptance frame using the at least one hashing algorithm to obtain a second hashed package — 508

Electronically transmit, by a transmitting device of the processing server, the first hashed package to a computing device — 510

Receiving, by the receiving device of the processing server, a received hashed package from the computing device — 512

Validate, the received hashed package as being created using the received data value and acceptance frame via comparison of the received hashed package to the second hashed package — 514

METHOD AND SYSTEM FOR VALIDATION OF HASHED DATA VIA ACCEPTANCE FRAMES

FIELD

The present disclosure relates to the validation of hashed data using acceptance frames, specifically the addition of a known acceptance frame to provided data and the hashing thereof for validation of received data as proof of access to the provided data by a third party.

BACKGROUND

Verifying activities on a computer, particularly at the user interface level, can be very important. For example, a first party may want confirmation that a second party has viewed a document, received a file, made a purchase, entered a binding obligation, etc. In many instances, the first party may have to trust that the second party is genuine in their representation that they performed the desired action. In other instances, a third party may be used for verification, which may require additional time and resources by all parties involved. There are electronic systems that can assist in this regard, acting as trusted third party repositories, hashing electronic documents so that at a later time they can be re-hashed to determine whether the same hashed value results to confirm a document's unaltered state, tracing and logging key strokes and other computationally difficult and sometimes less than reliable or robust mechanisms.

Thus, there is a need for a system where data can be validated without the use of a third party and in such a way as can be easily and quickly confirmed as genuine by an involved party. Furthermore, the use of established, secure third party systems for the conveyance of such data and verifications can even further increase the accuracy and efficiency of such a system as needed for the entities involved.

SUMMARY

The present disclosure provides a description of systems and methods for validating receipt of hashed data.

A method for validating receipt of hashed data includes: storing, in a memory of a processing server, an acceptance frame and at least one hashing algorithm; receiving, by a receiving device of a processing server, a data value; hashing, by a hashing module of the processing server, the received data value using the at least one hashing algorithm to obtain a first hashed package; hashing, by the hashing module of the processing server, the received data value and the acceptance frame using the at least one hashing algorithm to obtain a second hashed package; electronically transmitting, by a transmitting device of the processing server, the first hashed package to a computing device; receiving, by the receiving device of the processing server, a received hashed package from the computing device; and validating, by a validation module of the processing server, the received hashed package as being created using the received data value and acceptance frame via comparison of the received hashed package to the second hashed package.

A system for validating receipt of hashed data includes: a validation module of a processing server; a memory of the processing server configured to store an acceptance frame and at least one hashing algorithm; a receiving device of a processing server configured to receive a data value; a hashing module of the processing server configured to hash the received data value using the at least one hashing algorithm to obtain a first hashed package, and hash the received data value and the acceptance frame using the at least one hashing algorithm to obtain a second hashed package; and a transmitting device of the processing server configured to electronically receive the first hashed package to a computing device. The receiving device of the processing server is further configured to receive a received hashed package from the computing device. The validation module of the processing server is configured to validate the received hashed package as being created using the received data value and acceptance frame via comparison of the received hashed package to the second hashed package.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 5 is a flow chart illustrating an exemplary method for validating receipt of hashed data in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network. In this disclosure, the payment network is being used to transmit information, and not necessarily transaction data.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, additional information may be captured, such as a source address, timestamp, etc. In some embodiments, a blockchain may also consist of additional, and in some instances arbitrary, data that is confirmed and validated by the blockchain network through proof of work and/or any other suitable verification techniques associated therewith. In some cases, such data may be included in the blockchain as part of transactions, such as included in additional data appended to transaction data. In some instances, the inclusion of such data in a blockchain may constitute a transaction. In such instances, a blockchain may not be directly associated with a specific digital, virtual, fiat, or other type of currency.

System for Validation of Data Using an Acceptance Frame

Figure 1:
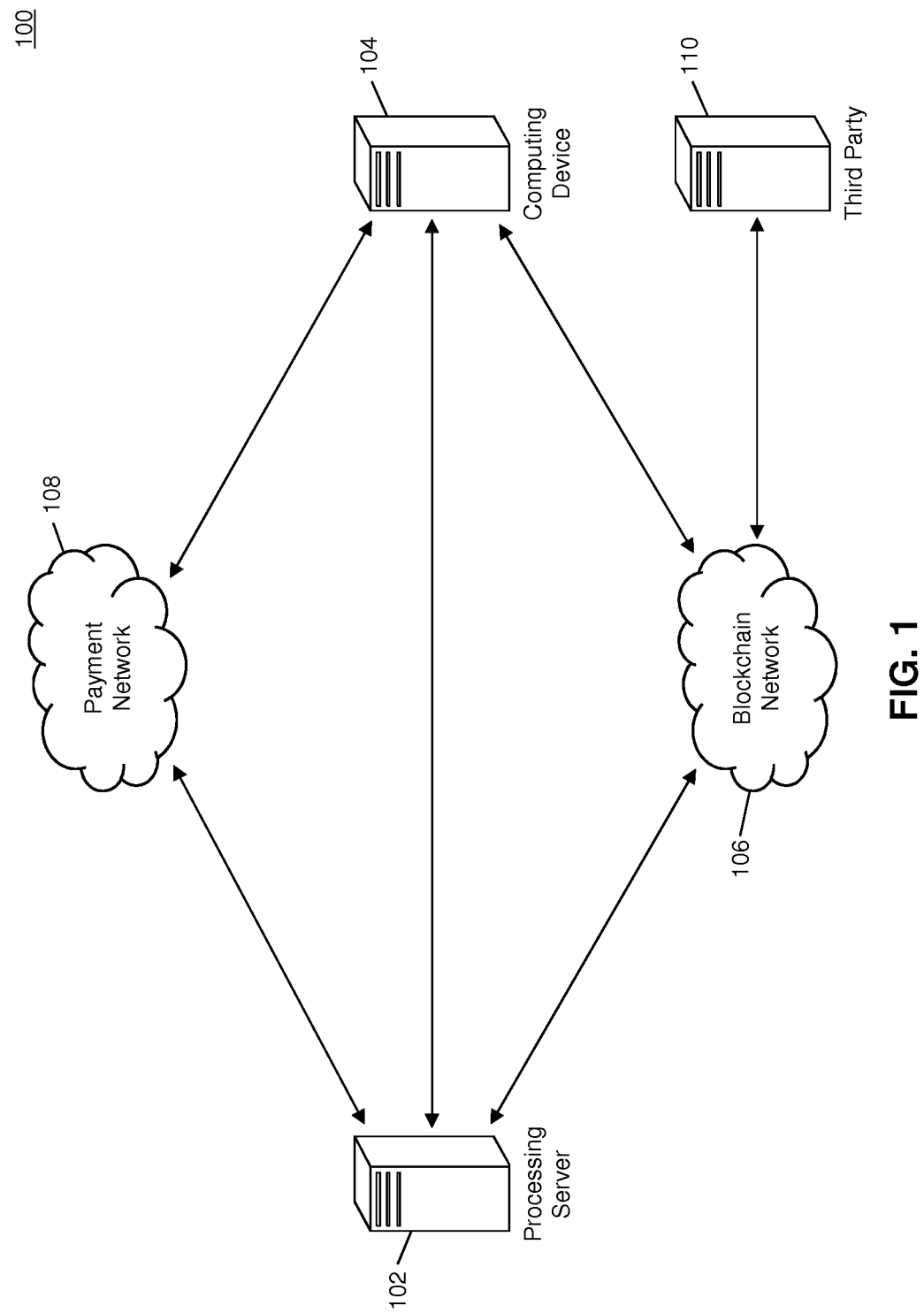
FIG. 1 is a block diagram illustrating a high level system architecture for validating receipt of hashed data using an acceptance frame and the transmission and publishing thereof in accordance with exemplary embodiments.

FIG. 1 illustrates a system 100 for the validation of data, specifically hashed data, using an acceptance frame in order to ensure accuracy of data and security of data in transmission.

The system 100 may include a processing server 102. The processing server 102, discussed in more detail below, may be configured to validate the receipt and viewing of data via the use of acceptance frames, and may also be configured to electronically transmit and publish the data and/or proof of receipt thereby using one or more secure methods associated therewith. The processing server 102 may be configured to electronically transmit a data value to a computing device 104. The data value may be superimposed on a data signal electronically transmitted via a suitable communication network, such as a local area network, wireless area network, the Internet, cellular communication network, radio frequency network, etc.

The data value may be string, data file, video, image, or any other suitable type of data value for which the computing device 104 is to receive the receipt thereof and to verify to the processing server 102 that the data value was received and accessed. For example, the data value may be a contract or a list of terms and conditions for which a user of the computing device 104 is to accept. The data value may comprise the data to be accepted or may comprise a data file that includes the data to be accepted. For instance, if the user of the computing device 104 is to confirm receipt of a contract, the data value may be a data file (e.g., a text or word processing document) that includes the contract. In instances where the processing server 102 is to verify that the user of the computing device 104 has accessed the actual contract itself and not only verify receipt of the contract, the data value may comprise the text of the contract or a portion thereof.

In some embodiments, the processing server 102 may hash the data value using one or more hashing algorithms prior to electronically transmitting the data value to the computing device 104. In such embodiments, the computing device 104 may receive a hashed package that results from the application of the hashing algorithm to the data value. In such instances, the computing device 104 may comprise one or more key-value stores, where the data value may be accessed using the received hashed package as a key. For example, the data value may be a data file, where the hashed package is a result of the hashing of the data file. In such an example, the computing device 104 may identify the data file using the hashed package as a key.

The computing device 104 may receive and may access or perform any other requested function regarding the data value and may verify the performance thereof via the use of an acceptance frame. The acceptance frame may be an additional data value that has been agreed upon by the processing server 102 and the computing device 104 to represent the computing device's (e.g., or user associated therewith) receipt, viewing, and/or acceptance of the provided data value. The acceptance frame may be, for example, a text string, an image, a data file, etc.

For instance, the processing server 102 may provide data (e.g., a statement of facts, press releases, terms and conditions for a contract, etc. and other forms of content) to the computing device 104, with the entities associated therewith agreeing on the text string "YES" serving as the acceptance frame. The processing server 102 may electronically transmit the terms and conditions to the computing device 104 (e.g., which may be hashed into a hashed package via one or more hashing algorithms) as the data value using a suitable communication network. The computing device 104 may access and view the terms and conditions and, if in agreement of the terms and conditions, may append the acceptance frame to the terms and conditions. For example, the statement might comprise "Recipient agrees with the content," with the acceptance frame being "+YES," such that, if the user of the computing device 104 (e.g., the recipient referred to in the content) accepts the statement, the appending of the acceptance frame would result in the string "Recipient agrees with the content +YES."

Once the acceptance frame has been added to the data value, the computing device 104 may hash the acceptance frame and data value to obtain an additional hashed package. This additional hashed package may then be electronically transmitted by the computing device 104 to the processing server 102 using a suitable communication network. The processing server 102 may then validate the received hashed package to ensure that the user of the computing device 104 has both accessed and accepted the terms and conditions. Validation may include the generation of a second hashed package by the computing device 104, by applying the hashing algorithm used by the computing device 104 to the data value and agreed upon acceptance frame. If the resulting second hashed package is the same as the hashed package returned by the computing device 104, then the validation is complete as it confirms that the computing device 104 viewed the correct data value and also appended the agreed upon acceptance frame, as any variation in the data value or acceptance frame would have resulted in a different hashed package. As such, the actions performed by the computing device 104 may be fully confirmed via the validation without the use of third parties and done using purely data.

In some instances, entities associated with the processing server 102 and/or the computing device 104 may want to publish verification of the acceptance. In such instances, the verification may be published using a blockchain network 106, such as by inclusion in a blockchain associated therewith. The blockchain network 106 may be, for example, a network of computing devices and/or systems configured to establish and maintain a blockchain, which may be a ledger of electronic transactions that is independently verifiable via proof of work or other suitable method and de-centralized. The computing device 104 may, once the data value has been received and accepted (e.g., or confirmation of the receipt or viewing of the data performed, etc.) via the appending of the acceptance frame, hash the data value and acceptance frame and electronically transmit the result of the hash to the blockchain network 106 for publishing. The blockchain network 106 may publish the hash result in the blockchain, which may be accessed by the processing server 102 using suitable methods and systems. The processing server 102 may then verify the acceptance by the computing device 104 based on the published hash result as compared to the second hashed package generated thereby.

In some embodiments, the blockchain network 106 may be used for verification of the acceptance by a third party 110. In such an embodiment, the third party 110 may receive the data value and acceptance frame from the processing server 102 and/or computing device 104. The third party 110 may hash the data value and acceptance frame using the same hashing algorithm(s) and may confirm the acceptance performed by the computing device 104 by identifying the hash result in the blockchain. In some instances, the blockchain may include information identifying the source of the hash included in the blockchain, such as via the use of a signed address or other data that may be unique to the source. For example, the computing device 104 may provide a signed address to the blockchain network 106 that is uniquely associated with the computing device 104, which may be included in the blockchain with the hash result. The signed address may be used by the third party 110 (e.g., and/or the processing server 102) as verification not only of the acceptance by the computing device 104, but also of the hash result as being genuinely submitted by the computing device 104. In some instances, the signed address may be used in a transaction posted to the blockchain. In such an instance, the processing server 102 may transfer an amount of blockchain currency associated with the blockchain to the computing device 104 via the blockchain network 106, where the hashed package may be included in the transaction as posted to the blockchain. The computing device 104 may, upon acceptance, transfer an amount of blockchain currency back to the processing server 102 along with the hashed package that included the appended acceptance frame, where the amount may be the same amount or a related amount (e.g., minus a payment, processing fee, etc.). Such instances may be required in cases where the blockchain network 106 may require transfer of currency to post data to the blockchain. In such instances, the transfer of currency may be used for even further verification via the confirmation of transfer amounts and addresses involved in the transfer thereof.

In some embodiments, the system 100 may also include a payment network 108. The payment network 108 may be used in the electronic transmission of data to and from the processing server 102 and computing device 104. For example, the payment rails associated with the payment network 108, discussed in more detail below with respect to the process 600 illustrated in FIG. 6, may be used in the transmission of data messages comprising the hashed packages to and from the processing server 102 and computing device 104. In such instances, the secure payment rails may be used to provide additional security in the electronic transmission of data.

In some such embodiments, the hashed packages may be included in transaction messages. Transaction messages may be specially formatted data messages that are formatted pursuant to one or more standards governing the exchange of financial transaction messages, such as the International Organization for Standardization's ISO 8583 standard. Transaction messages may include a plurality of data elements, each of which may be configured to store data as set forth in the associated standard(s). In some embodiments, a transaction message may also include one or more bitmaps, where each bitmap may specify the data elements included therein and the data stored therein. In an exemplary embodiment, a transaction message used to convey the hashed packages may include a tertiary bitmap, where the tertiary bitmap may specify one or more data elements configured to store the data value, acceptance frame, and/or hashed packages used in performing the functions discussed herein. In some cases, the data value, acceptance frame, and/or hashed package may be stored in a data element reserved for private use or other suitable data element, which may be specified in one or more bitmaps, including a tertiary bitmap, if applicable. In such embodiments, the data value stored in the data element of the transaction message may be a reference or identifier associated with other data. For example, the data value may be a hash of a document, such that it may be conveyed to the computing device 104 without transmittal of the entire content of the document, resulting in a smaller, faster transmission. The computing device 104 may use the document hash to identify the data to be reviewed (e.g., using the document hash as a key in a key-value pair) and may append the acceptance frame if applicable (e.g., to indicate acceptance of terms and conditions included therein).

The methods and systems discussed herein may enable two entities to exchange data and perform verification thereof via computing devices by using an acceptance frame and hashing algorithms. The use of an acceptance frame may ensure that only a party that has knowledge of the acceptance frame has viewed the data value. The use of hashing algorithms may provide significantly high assurance to the processing server 102 of the viewing (e.g., and acceptance) of the data value, particularly in instances where the hashing algorithm has an astronomically low chance that a different data value and acceptance frame could be hashed and achieve the same result. As such, the methods and systems discussed herein result in verification of data at an extremely high level that can be performed by a specifically configured computing device without the use of third party systems.

Such methods may be applicable, for example, in the acceptance of terms and conditions, as discussed above. Such methods may also be useful in the exchange of documents. For example, the data value provided by the processing server 102 may be a hash of a document to be accessed by the computing device 104. The return of a hashed package that is the result of a hash applied to the document and the acceptance frame by the computing device 104 may ensure that the computing device 104 accessed the document as requested by the processing server 102. In some instances, the methods discussed herein may be applied to the exchange of a set of documents. For example, the processing server 102 and computing device 104 may repeat the process as discussed above for multiple documents. In some embodiments, the computing device 104 may add each new document that is accessed to an ongoing hash for which each new document is appended, such as in a Merkle tree. In some instances, the acceptance frame may be added each time the hash is performed. In other instances, the acceptance frame may be added only once, such as after each of the documents have been added. In each instance, the inclusion of the acceptance frame may ensure the receipt and/or viewing of each of the documents in the set due to the uniqueness of the resulting hash.

The methods discussed herein may also be used in conjunction with escrow actions performed by a third party 110. For example, the third party 110 may use the hashed package provided by the computing device 104 for verification of actions to be performed by the computing device 104 as required by an agreement between the processing server 102 and computing device 104. The third party 110 may verify the hashed package to verify that the required actions have been performed, and may then perform their assigned escrow functions, such as by releasing funds, documents, etc. to the computing device 104 and/or processing server 102. For instance, the processing server 102 (e.g., or an entity associated therewith) may pay the principal of a loan to the third party 110, to be released to the computing device 104 (e.g., or an entity associated therewith) once the computing device 104 has accepted the terms and conditions set forth by the processing server 102 using the methods discussed herein, which may be verified by the third party 110.

Processing Server

Figure 2:
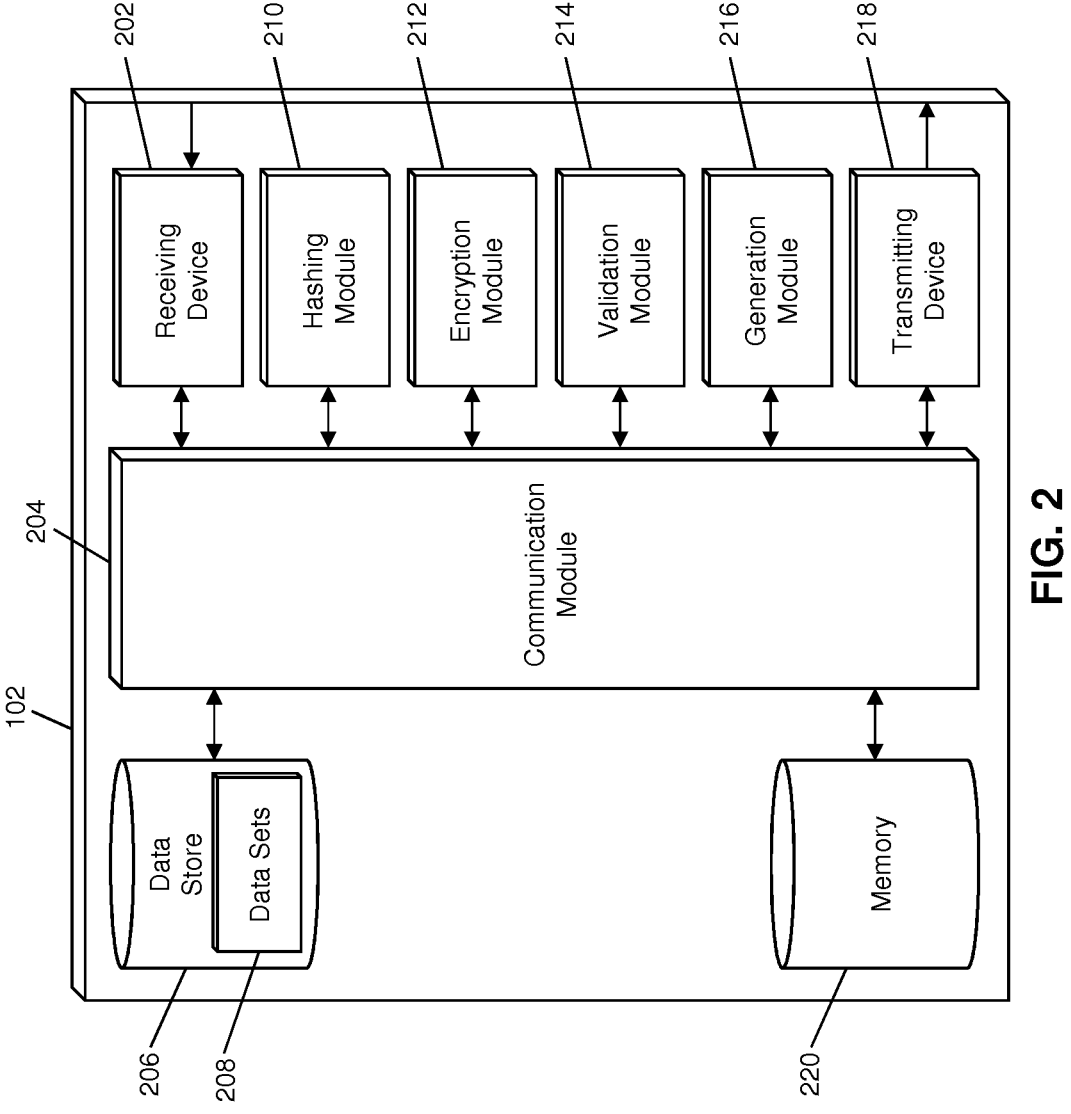
FIG. 2 is a block diagram illustrating the processing server of FIG. 1 for the validation of hashed data received from a computing device in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 108 for the transmission of transaction messages that include sensitive financial data and information. In some instances, the receiving device 202 may also be configured to receive data from computing devices 104, blockchain networks 106, payment networks 108, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals from the computing device 104. The data signals received from the computing device 104 may be superimposed with hashed packages, which may be used by the processing server 102 in the validation of receipt and acceptance of a provided data value. In some instances, the data signals may be received via the payment network 108, and may be comprised of transaction messages formatted based on one or more associated standards. For example, a hashed package provided by the computing device 104 may be included in a data element as set forth in a tertiary bitmap included in a transaction message received by the receiving device 202 via the payment network 108. In some instances, the receiving unit 202 may be configured to receive data via one or more input devices. In such instances, input devices may be used to input data values for use in performing the functions discussed herein. The receiving unit 202 may also receive data signals from additional computing devices, such as may be associated with the processing server 102, such as data signals superimposed with data values and/or acceptance frames for use in performing the functions discussed herein.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a hashing module 210, encryption module 212, validation module 214, generation module 216, etc. As used herein, the term "module" may be hardware designed to, or particularly programmed to, receive an input, perform one or more processes using the input, and provide an output. The input, output, and processes performed by various modules will be apparent to one skilled in the art based upon the present disclosure.

In some embodiments, the processing server 102 may include a data store 206. The data store 206 may be configured to store a plurality of data sets 208 using a suitable data storage format and schema. The data store 206 may be a relational database that utilizes structured query language for the storage, identification, modifying, updating, accessing, etc. of structured data sets stored therein.

Each data set 208 may be a structured data set configured to store at least one data value and associated acceptance frame. In some embodiments, a data set 208 may also include data associated with a computing device 104 to which the data value is to be electronically transmitted, such as a device identifier associated with the computing device 104 or corresponding computing system. A data set 208 may also include a plurality of hashed packages, such as packages resulting from application of one or more hashing algorithms to data values and/or acceptance frames stored therein.

In some embodiments, the processing server 102 may include a querying module (not shown). The querying module may be configured to execute queries on databases to identify information. The querying module may receive one or more data values or query strings, and may execute a query string based thereon on an indicated database, such as the data store 206, to identify information stored therein. The querying module may then output the identified information to an appropriate engine or module of the processing server 102 as necessary. The querying module may, for example, execute a query on the data store 206 to identify data sets 208 stored therein based on criteria provided by another module or engine of the processing server 102, such as the hashing module 210.

The hashing module 210 may be configured to apply one or more hashing algorithms to data to generate hashed packages. The hashing module 210 may receive data as input, such as a data value provided to the computing device 104, an acceptance frame, a combination thereof, etc., may apply one or more hashing algorithms to the data, and may output the hashed package for use by another module or engine of the processing server 102. In some instances, the hashing module 210 may be configured to use a different hashing algorithm to hash data values as used to hash data values with appended acceptance frames.

The processing server 102 may also include an encryption module 212. The encryption module 212 may be configured to encrypt and decrypt data for use in performing the functions discussed herein. The encryption module 212 may receive data to be encrypted or decrypted as input, as well as instructions regarding encryption or decryption and algorithms associated therewith, may perform the requested encryption or decryption, and output the resulting data. For example, the encryption module 212 may encrypt an acceptance frame prior to providing to a computing device 104 for decryption and use by the computing device 104 in the acceptance of a provided data value.

The processing server 102 may also include a validation module 214. The validation module may be configured to validate hashed data. The validation module 214 may receive a hashed package received from the computing device 104 (e.g., via the receiving device 202) and may perform validation thereof. The validation module 214 may also receive a hashed package generated by the hashing module 210, or may receive data for use in the identification thereof, such as a device identifier associated with the computing device 104 from which the received hashed package originated, which may be used in the identification of the corresponding generated hashed package in a data set 208 in the data store 206. The validation module 214 may validate a received hashed package as compared to a generated hashed package and may output the validation result.

In some embodiments, the processing server 102 may also include a generation module 216. The generation module 216 may be configured to generate transaction messages for use in the conveyance of data values, acceptance frames, and/or hashed packages. The generation module 216 may receive a hashed package or other data to be included in a transaction message, may generate the transaction message, and may output the transaction message to another module or engine of the processing server 102, such as to a transmitting device 218 for transmission thereof to the computing device 104 via the payment network 108. The transaction message may be formatted based on one or more standards, such as the ISO 8583 standard, and may include the hashed package or other data in a data element as identified in a tertiary bitmap included therein.

The transmitting device 218 may be configured to transmit data over one or more networks via one or more network protocols. In some embodiments, the transmitting device 218 may be configured to transmit data over the payment rails, such as using specially configured infrastructure associated with payment networks 108 for the transmission of transaction messages that include sensitive financial data and information, such as identified payment credentials. In some instances, the transmitting device 218 may be configured to transmit data to computing devices 104, blockchain networks 106, payment networks 108, third parties 110, and other entities via alternative networks, such as the Internet. In some embodiments, the transmitting device 218 may be comprised of multiple devices, such as different transmitting devices for transmitting data over different networks, such as a first transmitting device for transmitting data over the payment rails and a second transmitting device for transmitting data over the Internet. The transmitting device 218 may electronically transmit data signals that have data superimposed that may be parsed by a receiving computing device. In some instances, the transmitting device 218 may include one or more modules for superimposing, encoding, or otherwise formatting data into data signals suitable for transmission.

The transmitting device 218 may be configured to electronically transmit data signals to computing devices 104 superimposed with hashed packages and/or data values. The transmitting device 218 may also be configured to electronically transmit data signals superimposed with acceptance frames and other data that may be suitable for use by the computing device 104 in performing the functions discussed herein. In some embodiments, the transmitting device 218 may be configured to transmit transaction messages via a payment network 108 using suitable communication methods and protocols. The transmitting device 218 may also be configured to transmit data signals to a blockchain network 106, such as for the posting of data to the blockchain or to request blockchain data for retrieval (e.g., for validation by the validation module 214).

The processing server 102 may also include a memory 220. The memory 220 may be configured to store data for use by the processing server 102 in performing the functions discussed herein. The memory 220 may be configured to store data using suitable data formatting methods and schema and may be any suitable type of memory, such as read-only memory, random access memory, etc. The memory 220 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art.

Process for Validating Receipt of Hashed Data

Figure 3A:
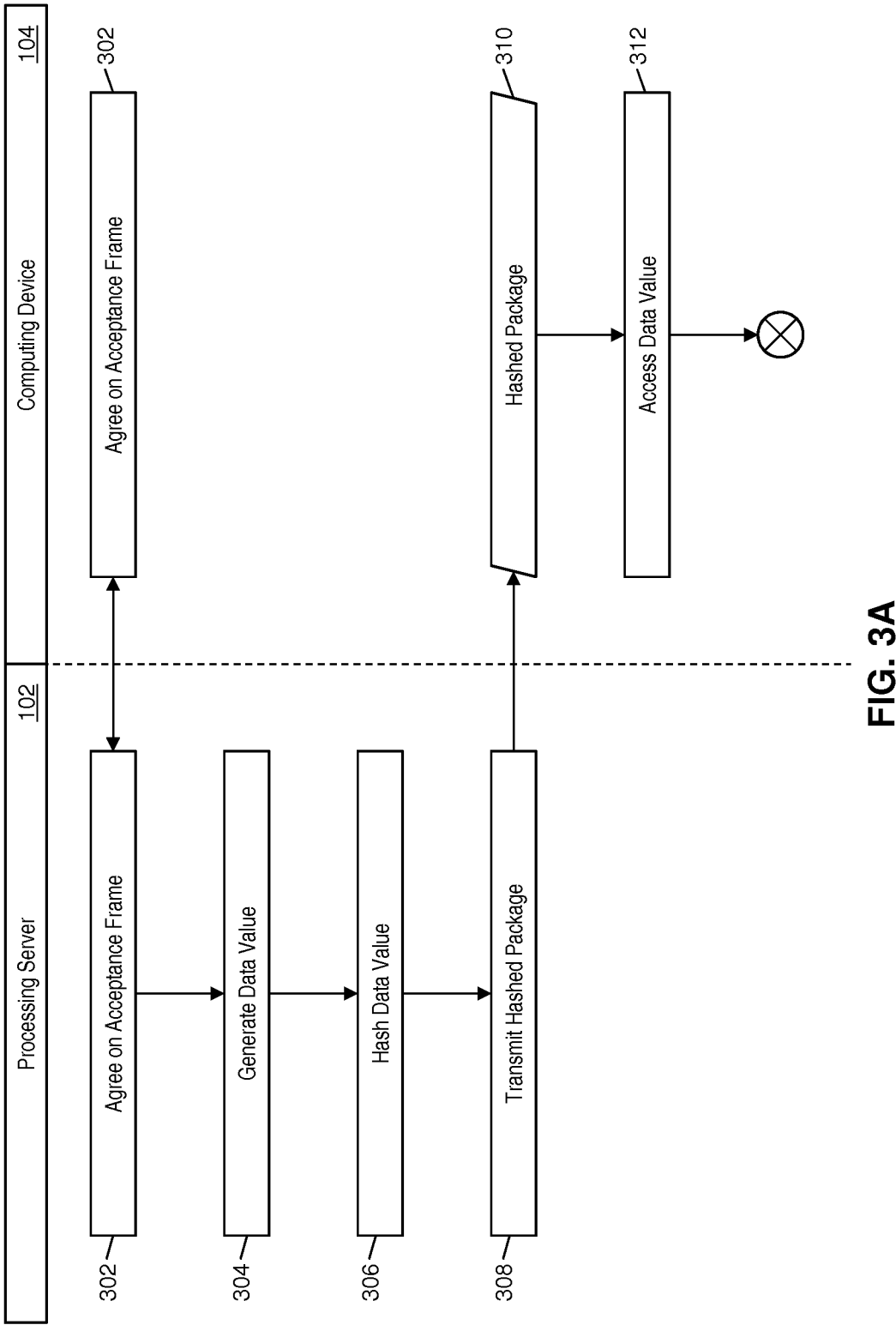
FIGS. 3A and 3B are a flow diagram illustrating a process for the hashing and validation of data using an acceptance frame using the system of FIG. 1 in accordance with exemplary embodiments.
Figure 3B:
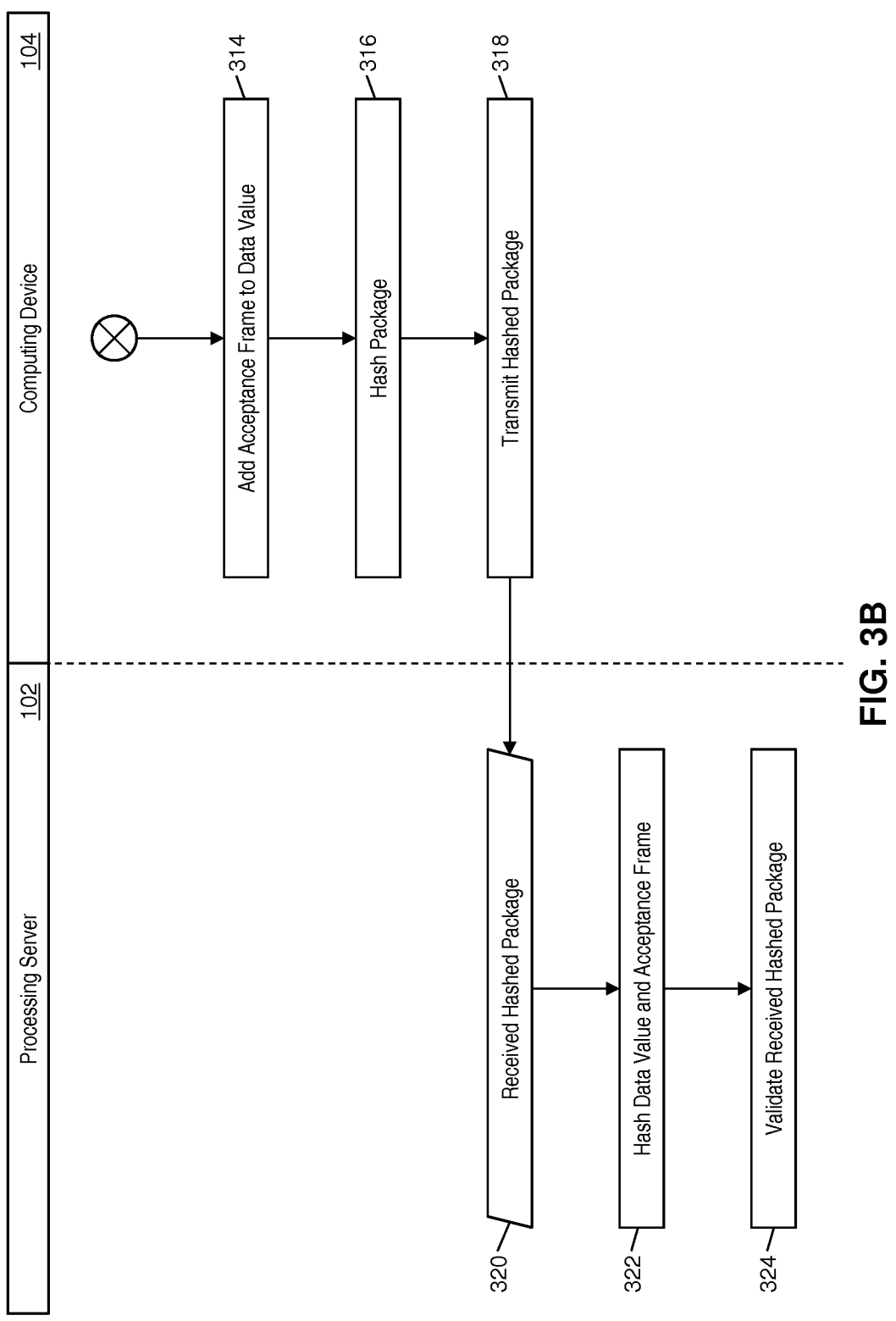

FIGS. 3A and 3B illustrate a process for the validation of receipt of hashed data via the use of an acceptance frame.

In step 302, the processing server 102 and computing device 104 (e.g., and/or entities associated therewith) may agree upon an acceptance frame to be used to indicate acceptance (e.g., or receipt, access, or other action to be performed) of data provided by the processing server 102 to the computing device 104. The acceptance frame may be, for instance, a data value, such as a string, document, data file, etc. In step 304, the processing server 102 may generate a data value to be provided to the computing device 104 for which acceptance is requested. The data value may be generated by one or more modules or engines included in the processing server 102, or may be received (e.g., via the receiving device 202). For example, a user of the processing server 102 may input the data value, such as by inputting terms and conditions to be accepted by the computing device 104 using a suitable input device, such as a keyboard.

In step 306, the hashing module 210 of the processing server 102 may hash the data value using one or more hashing algorithms. The hashing of the data value may output a first hashed package. In some embodiments, the first hashed package may be stored in a corresponding data set 208 in the data store 206, such as by the execution of a query on the data store 206 by the querying module of the processing server 102. In step 308, the transmitting device 218 of the processing server 102 may electronically transmit the first hashed package to the computing device 104 using a suitable communication network. In some embodiments, the first hashed package may be stored in a data element included in a transaction message (e.g., generated by the generation module 216 of the processing server 102) that includes a tertiary bitmap indicating the data element used to store the hashed package.

In step 310, the computing device 104 may receive the first hashed package. In step 312, the computing device 104 may access the data value that was used to generate the first hashed package. The data value may be accessed by the use of the first hashed package as a key in a key-value store or other type of data storage for which the first hashed package may be used to identify the data value. The computing device 104 (e.g., or a user thereof) may access the data value and may be in acceptance of the data represented thereby. For example, the user may accept the terms and conditions comprising the data value. In step 314, the computing device 104 may add the agreed upon acceptance frame to the data value using methods and systems that will be apparent to persons having skill in the relevant art.

In step 316, the computing device 104 may hash the acceptance frame and data value using one or more hashing algorithms. In some embodiments, the same hashing algorithm used to hash the data value by the hashing module 210 of the processing server 102 (e.g., in step 306) may be used to hash the acceptance frame and data value. In other embodiments, a separate hashing algorithm may be used. In step 318, the computing device 104 may electronically transmit the resulting hashed package to the processing server 102 using a suitable communication network.

In step 320, the receiving unit 202 of the processing server 102 may receive the hashed package (the "received hashed package") from the computing device 104. In step 322, the hashing module 210 of the processing server 102 may hash the data value and agreed upon acceptance frame using the same one or more hashing algorithms used by the computing device 104 in the generation of the received hashed package. In step 324, the resulting second hashed package may be used by the validation module 214 to validate the received hashed package, such as by comparing the two hashed packages to ensure that the hashed packages have the same value.

In some embodiments, one or more steps of the process illustrated in FIGS. 3A and 3B may be repeated to validate additional data exchanged between the processing server 102 and computing device 104. For example, steps 304 through 312 may be repeated to provide additional data (e.g., documents, more terms and conditions, etc.) to the computing device 104. The computing device 104 may repeat step 316, which may include hashing a package consisting of each subsequently received data value (e.g., or hashes thereof), which may be validated by the processing server 102. In some instances, the acceptance frame may be added to the data prior to hashing in each instance. For example, the processing server 102 may transmit document A to the computing device 104. The computing device 104 may view the document, append the acceptance frame, hash the package, and transmit the hashed package to the processing server 102 for validation. The processing server 102 may then transmit document B. The computing device 104 may hash a package comprising the hash of document A or the first hashed package (e.g., as in a Merkle tree), to generate a subsequent hashed package, which may be transmitted to the processing server 102 for validation. In such an example, a series of documents or other data values may be continually validated by the processing server 102 using one or more acceptance frames.

Process for Third Party Verification of Receipt of Hashed Data

Figure 4:
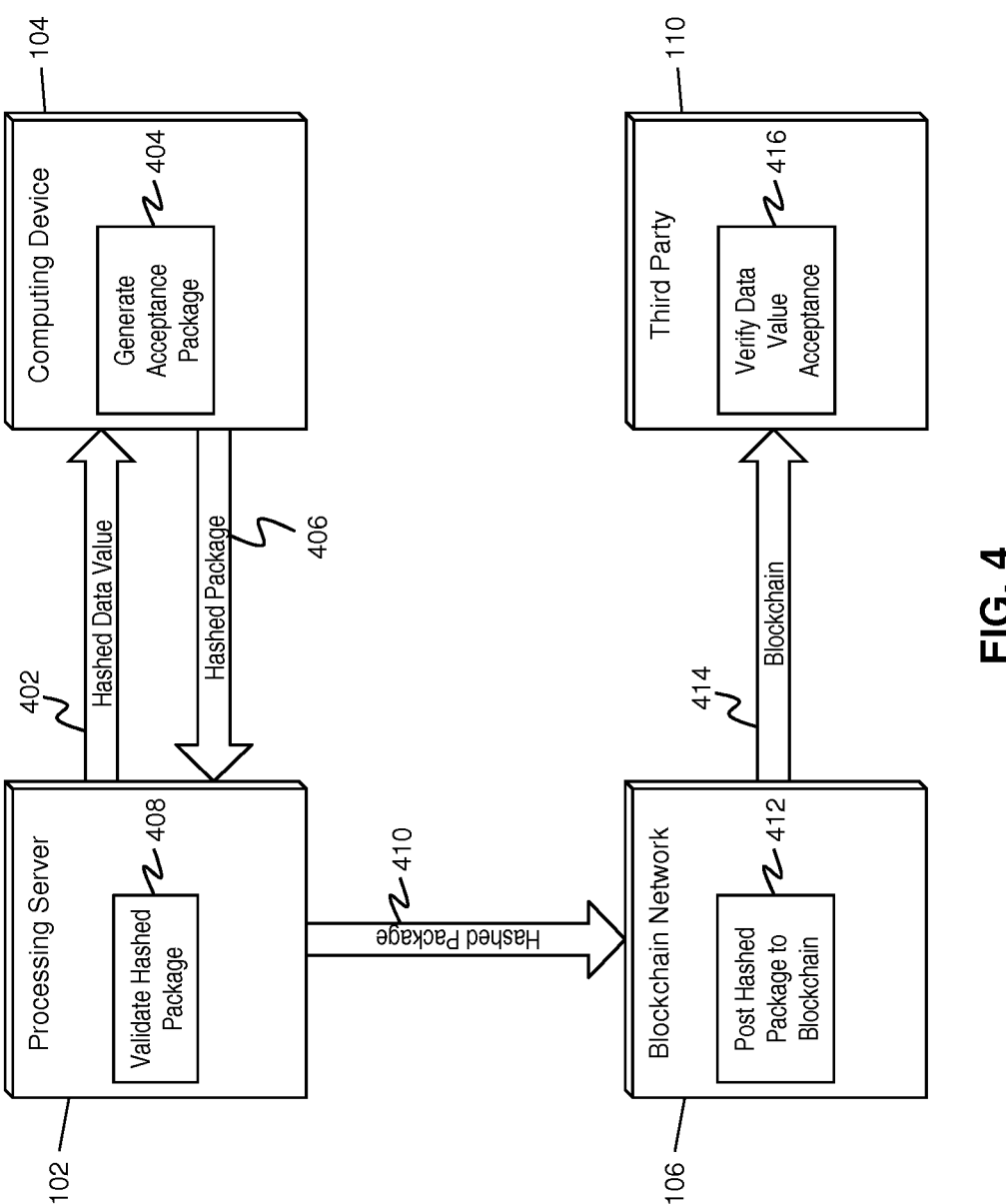
FIG. 4 is a flow diagram illustrating a process for the validation and verification of data using an acceptance frame in the system of FIG. 1 in accordance with exemplary embodiments.

FIG. 4 illustrates a process 400 for the verification of receipt of hashed data by the computing device 104 of FIG. 1 by a third party 110 using a blockchain network 106.

In step 402, the transmitting device 218 of the processing server 102 may electronically transmit a data signal to the computing device 104 superimposed with a hashed data value (e.g., generated via the hashing module 210 of the processing server 102). In step 404, the computing device 104 may generate an acceptance package using the methods discussed above, such as by accessing the data value used to generate the hashed data value, appending the acceptance frame, and hashing the combined data value and acceptance frame. In step 406, the computing device 104 may electronically transmit the hashed package to the processing server 102, to be received by the receiving unit 202.

In step 408, the validation module 214 of the processing server 102 may validate the received hashed package, such as by comparing the received hashed package to a hashed package generated by the hashing module 210 of the processing server 102 using the same data value, acceptance frame, and hashing algorithms. In step 410, the transmitting device 218 of the processing server 102 may electronically transmit a data signal to the blockchain network 106 superimposed with the received (and validated) hashed package. In some embodiments, step 410 may be performed by the computing device 104. In some instances, step 410 may be performed by the computing device 104 following indication that validation by the processing server 102 in step 408 was successful, such as by receipt of a notification electronically transmitted to the computing device 104 by the transmitting device 218 of the processing server 102.

In step 412, the blockchain network 106 may post the hashed package to the blockchain using suitable methods and systems. In some instances, the inclusion of the hashed package in the blockchain may be verified by a predetermined number of computing devices included in the block-chain network 106 prior to use in additional steps in the process 400. In some embodiments, data associated with the processing server 106 (e.g., or computing device 104) may be included in the blockchain as associated with the hashed package, such as a signed address. In step 414, the third party 110 may retrieve the blockchain from the blockchain network 106. In step 416, the third party 110 may verify the acceptance of the data value by the computing device 104 or entity associated therewith based on validation of the hashed package using the result of a hash of the data value and acceptance frame by the third party 110 for validation.

Exemplary Method for Validating Receipt of Hashed Data

FIG. 5 illustrates a method 500 for the validation of receipt of hashed data using an acceptance frame.

In step 502, an acceptance frame and at least one hashing algorithm may be stored in a memory (e.g., the memory 220) of a processing server (e.g., the processing server 102). In step 504, a data value may be received by a receiving device (e.g., the receiving unit 202) of the processing server 102. In step 506, the received data value may be hashed by a hashing module (e.g., the hashing module 210) of the processing server using the at least one hashing algorithm to obtain a first hashed package.

In step 508, the received data value and the acceptance frame may be hashed by the hashing module of the processing server using the at least one hashing algorithm to obtain a second hashed package. In step 510, the first hashed package may be electronically transmitted by a transmitting device (e.g., the transmitting device 218) of the processing server to a computing device (e.g., the computing device 104).

In step 512, the receiving device of the processing server 102 may receive a received hashed package from the computing device. In step 514, the received hashed package may be validated by a validation module (e.g., the validation module 214) of the processing server as being created using the received data value and acceptance frame via comparison of the received hashed package to the second hashed package.

In one embodiment, the method 500 may further include: storing, in the memory of the processing server, a subsequent frame; receiving, by the receiving device of the processing server, a second received hashed package from the computing device; hashing, by the hashing module of the processing server, the subsequent frame and additional data using the at least one hashing algorithm to obtain a third hashed package; and validating, by the validation module of the processing server, the second received hashed package as being created using the subsequent frame and additional data via comparison of the second received hashed package to the third hashed package. In a further embodiment, the additional data may be one of: (i) the second hashed package, and (ii) the returned data value and the returned acceptance frame.

In some embodiments, the at least one hashing algorithm may include a first hashing algorithm and a second hashing algorithm, where the first hashed package is obtained using the first hashing algorithm, and the second hashed package is obtained using the second hashing algorithm. In one embodiment, the method 500 may further include electronically transmitting, by the transmitting device of the processing server, the second hashed package to a blockchain network (e.g., the blockchain network 106) for inclusion in an associated blockchain. In some embodiments, the data value may be received from an input device interfaced with the processing server.

In one embodiment, the method 500 may further include generating, by a generation module (e.g., the generation module 216) of the processing server, a transaction message formatted based on one or more standards, wherein the transaction message includes a tertiary bitmap and includes a plurality of data elements including at least a data element configured to store the first hashed package, and wherein electronically transmitting the first hashed package includes electronically transmitting the generated transaction message. In a further embodiment, the generated transaction message may be electronically transmitted to the computing device via a payment network (e.g., the payment network 108).

In some embodiments, receiving the second hashed package may include receiving a transaction message formatted based on one or more standards, wherein the transaction message includes a tertiary bitmap and includes a plurality of data elements including at least a data element configured to store the second hashed package. In a further embodiment, the transaction message may be received from a payment network configured to route the transaction message from the computing device.

Payment Transaction Processing System and Process

Figure 6:
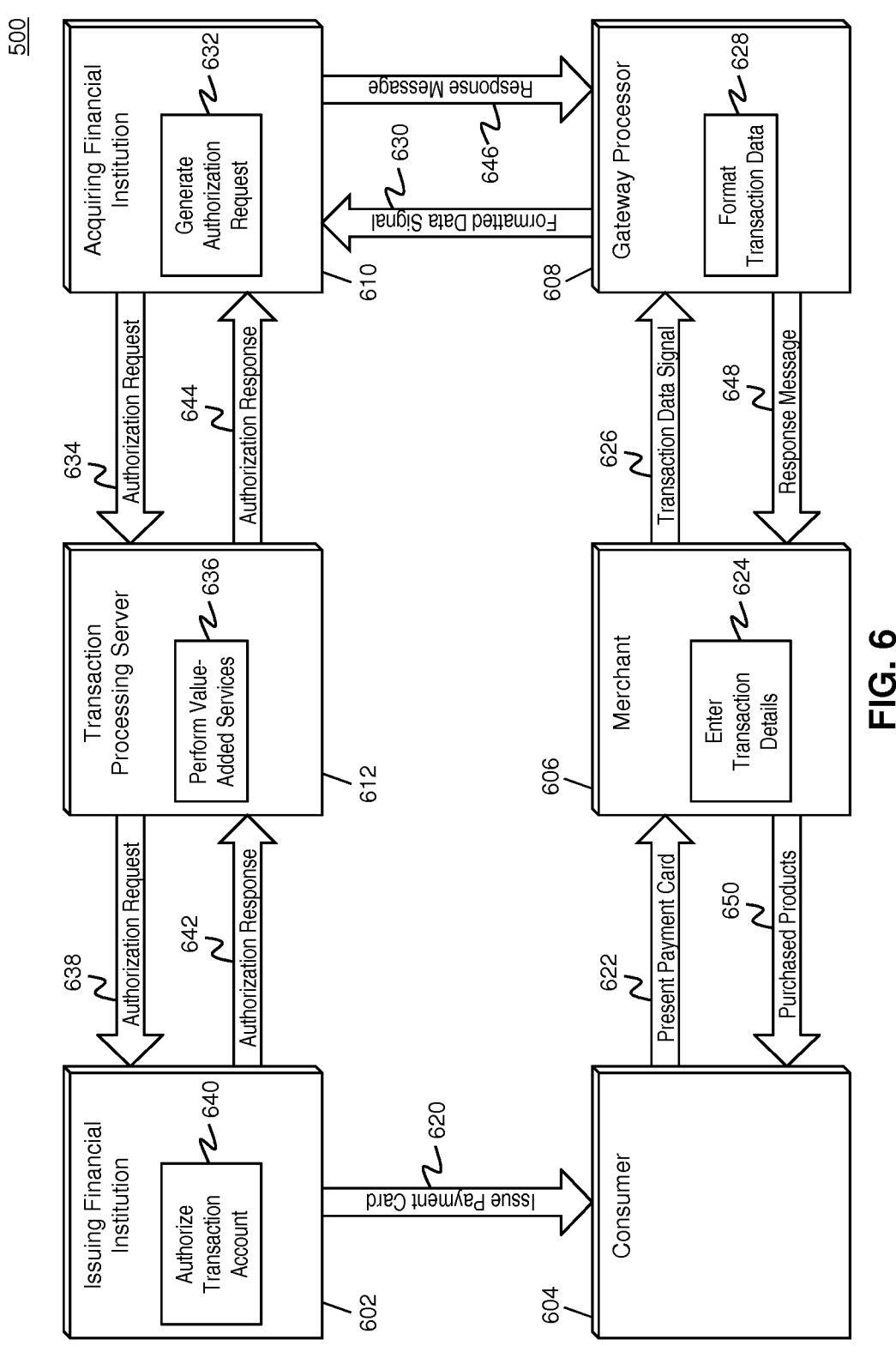
FIG. 6 is a flow diagram illustrating the processing of a payment transaction in accordance with exemplary embodiments.

FIG. 6 illustrates a transaction processing system and a process 600 for the processing of payment transactions in the system. The process 600 and steps included therein may be performed by one or more components of the system 100 discussed above, such as the processing server 102, computing device 104, payment network 108, etc. The processing of payment transactions using the system and process 600 illustrated in FIG. 6 and discussed below may utilize the payment rails, which may be comprised of the computing devices and infrastructure utilized to perform the steps of the process 600 as specially configured and programmed by the entities discussed below, including the transaction processing server 612, which may be associated with one or more payment networks configured to processing payment transactions. It will be apparent to persons having skill in the relevant art that the process 600 may be incorporated into the processes illustrated in FIGS. 3A, 3B, 4, and 5, discussed above, with respect to the step or steps involved in the processing of a payment transaction. In addition, the entities discussed herein for performing the process 600 may include one or more computing devices or systems configured to perform the functions discussed below. For instance, the merchant 606 may be comprised of one or more point of sale devices, a local communication network, a computing server, and other devices configured to perform the functions discussed below.

In step 620, an issuing financial institution 602 may issue a payment card or other suitable payment instrument to a consumer 604. The issuing financial institution may be a financial institution, such as a bank, or other suitable type of entity that administers and manages payment accounts and/or payment instruments for use with payment accounts that can be used to fund payment transactions. The consumer 604 may have a transaction account with the issuing financial institution 602 for which the issued payment card is associated, such that, when used in a payment transaction, the payment transaction is funded by the associated transaction account. In some embodiments, the payment card may be issued to the consumer 604 physically. In other embodiments, the payment card may be a virtual payment card or otherwise provisioned to the consumer 604 in an electronic format.

In step 622, the consumer 604 may present the issued payment card to a merchant 606 for use in funding a payment transaction. The merchant 606 may be a business, another consumer, or any entity that may engage in a payment transaction with the consumer 604. The payment card may be presented by the consumer 604 via providing the physical card to the merchant 606, electronically transmitting (e.g., via near field communication, wireless transmission, or other suitable electronic transmission type and protocol) payment details for the payment card, or initiating transmission of payment details to the merchant 606 via a third party. The merchant 606 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 624, the merchant 606 may enter transaction details into a point of sale computing system. The transaction details may include the payment details provided by the consumer 604 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 606 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 606 may be an online retailer in an e-commerce transaction. In such embodiments, the transaction details may be entered in a shopping cart or other repository for storing transaction data in an electronic transaction as will be apparent to persons having skill in the relevant art.

In step 626, the merchant 606 may electronically transmit a data signal superimposed with transaction data to a gateway processor 608. The gateway processor 608 may be an entity configured to receive transaction details from a merchant 606 for formatting and transmission to an acquiring financial institution 610. In some instances, a gateway processor 608 may be associated with a plurality of merchants 606 and a plurality of acquiring financial institutions 610. In such instances, the gateway processor 608 may receive transaction details for a plurality of different transactions involving various merchants, which may be forwarded on to appropriate acquiring financial institutions 610. By having relationships with multiple acquiring financial institutions 610 and having the requisite infrastructure to communicate with financial institutions using the payment rails, such as using application programming interfaces associated with the gateway processor 608 or financial institutions used for the submission, receipt, and retrieval of data, a gateway processor 608 may act as an intermediary for a merchant 606 to be able to conduct payment transactions via a single communication channel and format with the gateway processor 608, without having to maintain relationships with multiple acquiring financial institutions 610 and payment processors and the hardware associated thereto. Acquiring financial institutions 610 may be financial institutions, such as banks, or other entities that administers and manages payment accounts and/or payment instruments for use with payment accounts. In some instances, acquiring financial institutions 610 may manage transaction accounts for merchants 606. In some cases, a single financial institution may operate as both an issuing financial institution 602 and an acquiring financial institution 610.

The data signal transmitted from the merchant 606 to the gateway processor 608 may be superimposed with the transaction details for the payment transaction, which may be formatted based on one or more standards. In some embodiments, the standards may be set forth by the gateway processor 608, which may use a unique, proprietary format for the transmission of transaction data to/from the gateway processor 608. In other embodiments, a public standard may be used, such as the International Organization for Standardization's ISO 8683 standard. The standard may indicate the types of data that may be included, the formatting of the data, how the data is to be stored and transmitted, and other criteria for the transmission of the transaction data to the gateway processor 608.

In step 628, the gateway processor 608 may parse the transaction data signal to obtain the transaction data superimposed thereon and may format the transaction data as necessary. The formatting of the transaction data may be performed by the gateway processor 608 based on the proprietary standards of the gateway processor 608 or an acquiring financial institution 610 associated with the payment transaction. The proprietary standards may specify the type of data included in the transaction data and the format for storage and transmission of the data. The acquiring financial institution 610 may be identified by the gateway processor 608 using the transaction data, such as by parsing the transaction data (e.g., deconstructing into data elements) to obtain an account identifier included therein associated with the acquiring financial institution 610. In some instances, the gateway processor 608 may then format the transaction data based on the identified acquiring financial institution 610, such as to comply with standards of formatting specified by the acquiring financial institution 610. In some embodiments, the identified acquiring financial institution 610 may be associated with the merchant 606 involved in the payment transaction, and, in some cases, may manage a transaction account associated with the merchant 606.

In step 630, the gateway processor 608 may electronically transmit a data signal superimposed with the formatted transaction data to the identified acquiring financial institution 610. The acquiring financial institution 610 may receive the data signal and parse the signal to obtain the formatted transaction data superimposed thereon. In step 632, the acquiring financial institution may generate an authorization request for the payment transaction based on the formatted transaction data. The authorization request may be a specially formatted transaction message that is formatted pursuant to one or more standards, such as the ISO 8683 standard and standards set forth by a payment processor used to process the payment transaction, such as a payment network. The authorization request may be a transaction message that includes a message type indicator indicative of an authorization request, which may indicate that the merchant 606 involved in the payment transaction is requesting payment or a promise of payment from the issuing financial institution 602 for the transaction. The authorization request may include a plurality of data elements, each data element being configured to store data as set forth in the associated standards, such as for storing an account number, application cryptogram, transaction amount, issuing financial institution 602 information, etc.

In step 634, the acquiring financial institution 610 may electronically transmit the authorization request to a transaction processing server 612 for processing. The transaction processing server 612 may be comprised of one or more computing devices as part of a payment network configured to process payment transactions. In some embodiments, the authorization request may be transmitted by a transaction processor at the acquiring financial institution 610 or other entity associated with the acquiring financial institution. The transaction processor may be one or more computing devices that include a plurality of communication channels for communication with the transaction processing server 612 for the transmission of transaction messages and other data to and from the transaction processing server 612. In some embodiments, the payment network associated with the transaction processing server 612 may own or operate each transaction processor such that the payment network may maintain control over the communication of transaction messages to and from the transaction processing server 612 for network and informational security.

In step 636, the transaction processing server 612 may perform value-added services for the payment transaction. Value-added services may be services specified by the issuing financial institution 602 that may provide additional value to the issuing financial institution 602 or the consumer 604 in the processing of payment transactions. Value-added services may include, for example, fraud scoring, transaction or account controls, account number mapping, offer redemption, loyalty processing, etc. For instance, when the transaction processing server 612 receives the transaction, a fraud score for the transaction may be calculated based on the data included therein and one or more fraud scoring algorithms and/or engines. In some instances, the transaction processing server 612 may first identify the issuing financial institution 602 associated with the transaction, and then identify any services indicated by the issuing financial institution 602 to be performed. The issuing financial institution 602 may be identified, for example, by data included in a specific data element included in the authorization request, such as an issuer identification number. In another example, the issuing financial institution 602 may be identified by the primary account number stored in the authorization request, such as by using a portion of the primary account number (e.g., a bank identification number) for identification.

In step 638, the transaction processing server 612 may electronically transmit the authorization request to the issuing financial institution 602. In some instances, the authorization request may be modified, or additional data included in or transmitted accompanying the authorization request as a result of the performance of value-added services by the transaction processing server 612. In some embodiments, the authorization request may be transmitted to a transaction processor (e.g., owned or operated by the transaction processing server 612) situated at the issuing financial institution 602 or an entity associated thereof, which may forward the authorization request to the issuing financial institution 602.

In step 640, the issuing financial institution 602 may authorize the transaction account for payment of the payment transaction. The authorization may be based on an available credit amount for the transaction account and the transaction amount for the payment transaction, fraud scores provided by the transaction processing server 612, and other considerations that will be apparent to persons having skill in the relevant art. The issuing financial institution 602 may modify the authorization request to include a response code indicating approval (e.g., or denial if the transaction is to be denied) of the payment transaction. The issuing financial institution 602 may also modify a message type indicator for the transaction message to indicate that the transaction message is changed to be an authorization response. In step 642, the issuing financial institution 602 may transmit (e.g., via a transaction processor) the authorization response to the transaction processing server 612.

In step 644, the transaction processing server 612 may forward the authorization response to the acquiring financial institution 610 (e.g., via a transaction processor). In step 646, the acquiring financial institution may generate a response message indicating approval or denial of the payment transaction as indicated in the response code of the authorization response, and may transmit the response message to the gateway processor 608 using the standards and protocols set forth by the gateway processor 608. In step 648, the gateway processor 608 may forward the response message to the merchant 606 using the appropriate standards and protocols. In step 660, if the transaction was approved, the merchant 606 may then provide the products purchased by the consumer 604 as part of the payment transaction to the consumer 604.

In some embodiments, once the process 600 has completed, payment from the issuing financial institution 602 to the acquiring financial institution 610 may be performed. In some instances, the payment may be made immediately or within one business day. In other instances, the payment may be made after a period of time, and in response to the submission of a clearing request from the acquiring financial institution 610 to the issuing financial institution 602 via the transaction processing server 602. In such instances, clearing requests for multiple payment transactions may be aggregated into a single clearing request, which may be used by the transaction processing server 612 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 640), the transaction processing server 612 may be configured to perform authorization of transactions on behalf of the issuing financial institution 602. Such actions may be referred to as "stand-in processing," where the transaction processing server "stands in" as the issuing financial institution 602. In such instances, the transaction processing server 612 may utilize rules set forth by the issuing financial institution 602 to determine approval or denial of the payment transaction, and may modify the transaction message accordingly prior to forwarding to the acquiring financial institution 610 in step 644. The transaction processing server 612 may retain data associated with transactions for which the transaction processing server 612 stands in, and may transmit the retained data to the issuing financial institution 602 once communication is reestablished. The issuing financial institution 602 may then process transaction accounts accordingly to accommodate for the time of lost communication.

In another example, if the transaction processing server 612 is unavailable for submission of the authorization request by the acquiring financial institution 610, then the transaction processor at the acquiring financial institution 610 may be configured to perform the processing of the transaction processing server 612 and the issuing financial institution 602. The transaction processor may include rules and data suitable for use in making a determination of approval or denial of the payment transaction based on the data included therein. For instance, the issuing financial institution 602 and/or transaction processing server 612 may set limits on transaction type, transaction amount, etc. that may be stored in the transaction processor and used to determine approval or denial of a payment transaction based thereon. In such instances, the acquiring financial institution 610 may receive an authorization response for the payment transaction even if the transaction processing server 612 is unavailable, ensuring that transactions are processed and no downtime is experienced even in instances where communication is unavailable. In such cases, the transaction processor may store transaction details for the payment transactions, which may be transmitted to the transaction processing server 612 (e.g., and from there to the associated issuing financial institutions 602) once communication is reestablished.

In some embodiments, transaction processors may be configured to include a plurality of different communication channels, which may utilize multiple communication cards and/or devices, to communicate with the transaction processing server 612 for the sending and receiving of transaction messages. For example, a transaction processor may be comprised of multiple computing devices, each having multiple communication ports that are connected to the transaction processing server 612. In such embodiments, the transaction processor may cycle through the communication channels when transmitting transaction messages to the transaction processing server 612, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 610 may identify that an authorization request involves an issuing financial institution 602 (e.g., via the bank identification number included in the transaction message) for which no value-added services are required. The transaction processor at the acquiring financial institution 610 may then transmit the authorization request directly to the transaction processor at the issuing financial institution 602 (e.g., without the authorization request passing through the transaction processing server 612), where the issuing financial institution 602 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 612 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 608, acquiring financial institution 610, etc.) for processing using this advanced network, and to quickly and efficiently receive a response regarding the ability for a consumer 604 to fund the payment transaction.

Computer System Architecture

Figure 7:
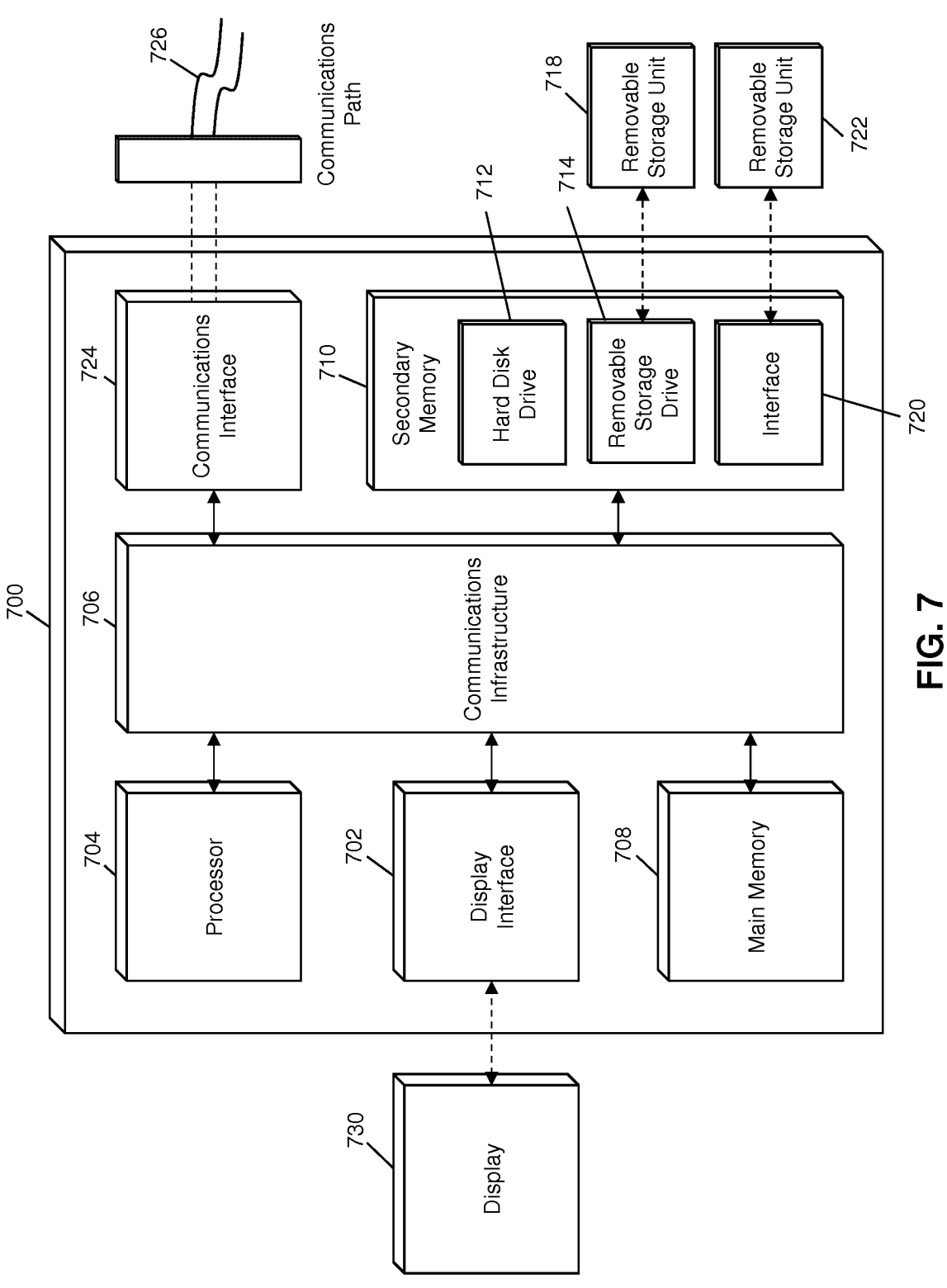
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, and 4-6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3A, 3B, and 4-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for validating receipt of hashed data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for validating receipt of hashed data, comprising:

transmitting, by a transmitting device of a processing server, an encrypted acceptance frame to a computing device;

receiving, by the computing device, the encrypted acceptance frame, from the processing server;

decrypting, by the computing device, the encrypted acceptance frame received from the processing server;

generating, by a processing device of the processing server, a data value for which acceptance by the computing device is to be requested;

generating a first hashed package by hashing, by a hashing module of the processing server, the data value, generated by the processing device of the processing server, using at least one hashing algorithm;

transmitting, by the transmitting device of the processing server, the first hashed package to the computing device via a payment network;

receiving, by the computing device, the first hashed package, from the processing server;

accessing, by the computing device, the data value, generated by the processing device of the processing server, using the first hashed package as a key in a key-value store;

accepting, by the computing device, the data value, generated by the processing device of the processing server, by (i) appending the decrypted acceptance frame to the data value, generated by the processing device of the processing server, and (ii) generating an additional hashed package that includes the data value, generated by the processing device of the processing server, appended with the decrypted acceptance frame;

transmitting, by the computing device, the additional hashed package along with a signed address uniquely associated with the computing device to a blockchain network for publishing in a blockchain;

accessing, by the processing server, the additional hashed package from the blockchain;

generating, by the processing server, a second hashed package by hashing the data value, generated by the processing device of the processing server, and the decrypted acceptance frame using the at least one hashing algorithm; and determining, by a validation module of the processing server, whether the additional hashed package is valid by comparing the additional hashed package, generated by the computing device and accessed from the blockchain, with the generated second hashed package.

2. The method of claim 1, further comprising:

storing, in a memory of the processing server, a subsequent acceptance frame;

receiving, by a receiving device of the processing server, a received hash hashed package from the computing device;

generating, by the hashing module of the processing server, a third hashed package by hashing the subsequent acceptance frame and additional data using the at least one hashing algorithm; and determining, by the validation module, whether the received hashed package is valid by comparing the received hashed package with the generated third hashed package.

3. The method of claim 2, wherein the additional data is one of:

(i) the second hashed package, and (ii) the data value and the subsequent acceptance frame.

4. The method of claim 1, wherein the at least one hashing algorithm includes a first hashing algorithm and a second hashing algorithm, the first hashed package is generated using the first hashing algorithm, and the second hashed package is generated using the second hashing algorithm.

5. The method of claim 1, further comprising receiving, via an input device interfaced with the processing server, input for use in generating the data value.

6. The method of claim 1, further comprising:

generating, by a generation module of the processing server, a transaction message based on one or more standards governing exchange of financial transaction messages, wherein the transaction message comprises a tertiary bitmap and comprises a plurality of data elements comprising at least a data element storing the first hashed package, wherein electronically transmitting the first hashed package further comprises electronically transmitting the generated transaction message.

7. The method of claim 1, further comprising:

receiving, by the processing server, a transaction message based on one or more standards governing exchange of financial transaction messages, wherein the transaction message comprises a tertiary bitmap and comprises a plurality of data elements that include at least a data element storing the additional hashed package.

8. The method of claim 7, further comprising:

receiving, by the processing server, the transaction message from the payment network routing the transaction message from the computing device.

9. A system for validating receipt of hashed data, comprising:

a payment network;

a blockchain network;

a processing server including a validation module, a transmitting device, a receiving device, a hashing module, a processing server processor, and a processing server memory storing executable instructions, that when executed by the processing server processor, causes the processing server processor to perform the steps of:

transmitting an encrypted acceptance frame to a computing device;

generating a data value for which acceptance by the computing device is to be requested;

generating a first hashed package by hashing the data value, generated by the processor of the processing server, using at least one hashing algorithm;

transmitting the first hashed package to the computing device via the payment network;

accessing an additional hashed package from a blockchain;

generating a second hashed package by hashing the data value, generated by the processor of the processing server, and the acceptance frame using the at least one hashing algorithm; and determining, by the validation module, whether the additional hashed package is valid by comparing the additional hashed package, generated by the computing device and accessed from the blockchain, with the generated second hashed package; and the computing device including a computing device processor, and a computing device memory storing executable instructions, that when executed by the computing device processor, causes the computing device processor to perform the steps of:

receiving the encrypted acceptance frame from the processing server;

decrypting the encrypted acceptance frame received from the processing server;

receiving the first hashed package from the processing server;

accessing the data value, generated by the processor of the processing server, using the first hashed package as a key in a key-value store;

accepting the data value, generated by the processor of the processing server, by (i) appending the decrypted acceptance frame to the data value, generated by the processor of the processing server, and (ii) generating the additional hashed package that includes the data value, generated by the processor of the processing server, appended with the decrypted acceptance frame and;

transmitting the additional hashed package along with a signed address uniquely associated with the computing device to the blockchain network for publishing in the blockchain.

10. The system of claim 9, wherein execution of the executable instructions further causes the processing server processor to perform the steps of:

storing, in the processing server memory, a subsequent acceptance frame, receiving, by the receiving device, a received hashed package from the computing device, generating, by the hashing module, a third hashed package by hashing the subsequent acceptance frame and additional data using the at least one hashing algorithm, and determining, by the validation module, whether the received hashed package is valid by comparing the received hashed package with the generated third hashed package.

11. The system of claim 10, wherein the additional data is one of:

(i) the second hashed package, and (ii) the data value and the subsequent acceptance frame.

12. The system of claim 9, wherein the at least one hashing algorithm includes a first hashing algorithm and a second hashing algorithm, the first hashed package is generated using the first hashing algorithm, and the second hashed package is generated using the second hashing algorithm.

13. The system of claim 9, further comprising an input device, wherein execution of the executable instructions further causes the processing server processor to perform the step of receiving input, via the input device for use in generating the data value.

14. The system of claim 9, the processing server further comprises a generation module, wherein execution of the executable instructions further causes the processing server processor to perform the steps of:

generating, by the generation module, a transaction message based on one or more standards governing exchange of financial transaction messages, wherein the transaction message comprises a tertiary bitmap and comprises a plurality of data elements comprising at least a data element storing the first hashed package, and electronically transmitting, by the transmitting device, the generated transaction message.

15. The system of claim 9, wherein the receiving device receives a transaction message based on one or more standards governing exchange of financial transaction messages, wherein the transaction message comprises a tertiary bitmap and comprises a plurality of data elements that includes at least a data element storing the additional hashed package.

16. The system of claim 15, wherein execution of the executable instructions further causes the processing server processor to perform the step of receiving the transaction message from a payment network routing the transaction message from the computing device.

17. The method of claim 1, further comprising:

electronically transmitting, by the transmitting device, the second hashed package to the blockchain network.

18. The system of claim 9, wherein execution of the executable instructions further causes the processing server processor to perform the step of electronically transmitting, by the transmitting device, the second hashed package to the blockchain network.

* * * * *